(12) United States Patent
Okajima

(10) Patent No.: US 7,428,182 B1
(45) Date of Patent: Sep. 23, 2008

(54) ELECTRONIC CIRCUIT SYSTEM, AND SIGNAL TRANSMISSION METHOD, TO IMPROVE SIGNAL TRANSMISSION EFFICIENCY AND SIMPLIFY SIGNAL TRANSMISSION MANAGEMENT

(75) Inventor: Yoshinori Okajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/372,166

(22) Filed: Aug. 11, 1999

(30) Foreign Application Priority Data

Dec. 22, 1998 (JP) ............................................. 10-363663

(51) Int. Cl.
G11C 8/00 (2006.01)

(52) U.S. Cl. ........................................ 365/233; 365/201
(58) Field of Classification Search ................... 365/201, 365/230.03, 230.06, 233; 716/17
See application file for complete search history.

(56) References Cited

U.S. PATENT DOCUMENTS

| | | | | |
|---|---|---|---|---|
| 4,860,000 A | | 8/1989 | Kobayashi | 340/825.5 |
| 5,907,554 A | | 5/1999 | Klos et al. | 370/460 |
| 5,930,187 A | * | 7/1999 | Sato et al. | 365/201 |
| 6,154,406 A | * | 11/2000 | Miyano et al. | 365/230.06 |
| 6,256,604 B1 | * | 7/2001 | Yabe et al. | 716/17 |

OTHER PUBLICATIONS

IEEE Standard 802.5–1999, Token Ring Access Method and Physical Layer Specifications, Sep. 29, 1989, the entire publication.
IEEE Standard 1149.1–1990, IEEE Standard Test Access Port and Boundary–Scan Architecture, published 1993, the entire publication.

* cited by examiner

*Primary Examiner*—Trong Phan
(74) *Attorney, Agent, or Firm*—Arent Fox PLLC

(57) ABSTRACT

An electronic circuit system has at least three macro circuits and a plurality of signal lines for connecting the macro circuits to one another into a loop. Each of the macro circuits includes a logic circuit and a memory circuit and has a plurality of input terminals and a plurality of output terminals. Signals are transmitted through the loop in a single specified direction in synchronization with a clock signal. Each of the macro circuits receives the signals at the input terminals thereof, accepts the signals if the signals are destined for the macro circuit, and transfers the signals to the output terminals thereof if the signals are not destined for the macro circuit. Even if the macro circuits simultaneously transmit signals, the electronic circuit system transmits the signals in the specified direction through the loop in synchronization with the clock signal up to destination macro circuits.

40 Claims, 9 Drawing Sheets

ELECTRONIC CIRCUIT SYSTEM, AND SIGNAL TRANSMISSION METHOD, TO IMPROVE SIGNAL TRANSMISSION EFFICIENCY AND SIMPLIFY SIGNAL TRANSMISSION MANAGEMENT

BACKGROUND OF THE INVENTION

1. Field of the Invention

The present invention relates to an electronic circuit system and a signal transmission method and, particularly, to an electronic circuit system, such as an LSI system having macro circuits including logic circuits and memory circuits, and a signal transmission method for such a system.

2. Description of the Related Art

Recent electronic circuit systems such as an LSI systems have a plurality of macro circuits each including logic circuits and memory circuits that employ a common bus. To manage the use of the common bus, the electronic circuit system must have a state machine that is complicated to deteriorate the efficiency of use of the common bus.

Prior arts and the problems thereof will be explained later with reference to drawings.

SUMMARY OF THE INVENTION

An object of the present invention is to provide an electronic circuit system, having macro circuits including logic circuits and memory circuits, capable of eliminating a common bus, improving signal transmission efficiency, and simplifying signal transmission management, as well as a signal transmission method for such a system.

Another object of the present invention is to provide an electronic circuit system capable of easily testing macro circuits in a system, and a signal transmission method for such system.

In order to accomplish the objects, a first aspect of the present invention provides an electronic circuit system having at least three macro circuits and signal lines for connecting the macro circuits to one another into a loop. The macro circuits include logic circuits and memory circuits and each have input terminals and output terminals. Signals are transmitted through the loop in a single specified direction in synchronization with a clock signal. Each of the macro circuits accepts signals received by the input terminals thereof if the received signals are destined thereto and transfers the received signals as they are to the output terminals thereof if the received signals are not destined thereto.

Even if the macro circuits simultaneously transmit signals, the first aspect is capable of transmitting the signals in the specified direction through the loop in synchronization with the clock signal up to destination macro circuits. As a result, the first aspect needs no common bus or state machine, which is essential for the prior art, thereby improving signal transmission efficiency and simplifying signal transmission management.

A second aspect of the present invention provides an electronic circuit system having a first macro circuit that is a logic circuit, second to "n"th macro circuits (n being an integer larger than 3) that include memory circuits but no logic circuits, and signal lines for connecting the first to "n"th macro circuits to one another in a half loop. Each of the first to "n"th macro circuits has input terminals and output terminals. The output terminals of the first macro circuit are at the start of the half loop and the input terminals thereof are at the end of the half loop, to transmit signals in a single specified direction through the half loop in synchronization with a clock signal. The first macro circuit accepts signals received by the input terminals thereof if the received signals are destined thereto. Each of the second to "n"th macro circuits accepts signals received by the input terminals thereof if the received signals are destined thereto and transmits the received signals as they are from the output terminals thereof without accepting the received signals if the received signals are not destined thereto.

Even if the macro circuits simultaneously transmit signals, the second aspect is capable of transmitting the signals in the specified direction through the half loop in synchronization with the clock signal up to destination macro circuits. As a result, the second aspect needs no common bus or state machine, which is essential for the prior art, thereby improving signal transmission efficiency and simplifying signal transmission management.

A third aspect of the present invention provides an electronic circuit system having external input terminals for receiving test signals, first to "m–1"th macro circuits (m being an integer larger than 2), an "m"th macro circuit, and signal lines for transmitting the test signals and connecting the external input terminals and the first to "m"th macro circuits to one another into a half loop. Each of the first to "m–1"th macro circuits has input terminals and output terminals for receiving and transmitting the test signals. The "m"th macro circuit has input terminals for receiving the test signals. The external input terminals are at the start of the half-loop and the input terminals of the "m"th macro circuit are at the end of the half loop, to transmit the test signals in a single specified direction through the half loop in synchronization with a clock signal. Each of the first to "m–1"th macro circuits accepts the test signals received by the input terminals thereof if the test signals are destined thereto and transmits the test signals from the output terminals thereof without accepting the test signals if the test signals are not destined thereto. The "m"th macro circuit accepts the test signals received by the input terminals thereof if the test signals are destined thereto.

By supplying test signals to the external input terminals, the third aspect is capable of externally testing the macro circuits, to improve testing efficiency.

The signal lines connect the external terminals and the first to "m"th macro circuits to one another in a half loop so that the lengths of the signal lines between the input terminals of a given macro circuit and the external terminals are equal to one another to eliminate skew in the test signals transmitted through the signal lines, thereby improving the testing speed.

A fourth aspect of the present invention provides a signal transmission method having the steps of connecting at least three macro circuits each having input terminals and output terminals to one another through signal lines to transmit signals in a single specified direction in synchronization with a clock signal, and in each of the macro circuits, accepting signals received by the input terminals thereof if the received signals are destined thereto and transferring the signals as they are to the output terminals thereof if the received signals are not destined thereto.

Even if the macro circuits simultaneously transmit signals, the fourth aspect is capable of transmitting the signals in the specified direction in synchronization with a clock signal up to destination macro circuits. As a result, the fourth aspect needs no common bus or state machine, which is essential for the prior art, thereby improving signal transmission efficiency and simplifying signal transmission management.

A fifth aspect of the present invention provides a signal transmission method having the steps of connecting first to "n"th macro circuits (n being an integer larger than 3) each having input terminals and output terminals to one another through signal lines, in a half loop, the first macro circuit being a logic circuit, the second to "n"th macro circuits including memory circuits but no logic circuits and having each input terminals and output terminals, the output terminals of the first macro circuit being at the start of the half loop, the input terminals of the first macro circuit being at the end of the half loop to transmit signals in a single specified direction through the half loop in synchronization with a clock signal, and in each of the second to "n"th macro circuits, accepting signals received by the input terminals thereof if the received signals are destined thereto and transmitting the received signals from the output terminals thereof without accepting the received signals if the received signals are not destined thereto. The method also includes the step of making the first macro circuit accept signals received by the input terminals thereof if the received signals are destined thereto.

Even if the macro circuits simultaneously transmit signals, the fifth aspect is capable of transmitting the signals in the specified direction through the half loop in synchronization with the clock signal up to destination macro circuits. As a result, the fifth aspect needs no common bus or state machine, which is essential for the prior art, thereby improving signal transmission efficiency and simplifying signal transmission management.

A sixth aspect of the present invention provides a signal transmission method having the steps of connecting external input terminals for receiving test signals, first to "m–1"th macro circuits (m being an integer greater than 2) each having input terminals and output terminals for receiving and transmitting the test signals, and an "m"th macro circuit having input terminals for receiving the test signals to one another in a half loop through signal lines for transmitting the test signals, the external input terminals being at the start of the half loop, the input terminals of the "m"th macro circuit being at the end of the half loop to transmit the test signals in a single specified direction through the half loop in synchronization with a clock signal, and in each of the first to "m–1"th macro circuits, accepting the test signals received by the input terminals thereof if the test signals are destined thereto and transmitting the test signals from the output terminals thereof without accepting the test signals if the test signals are not destined thereto. The method also includes the step of accepting, in the "m"th macro circuit, the test signals received by the input terminals thereof if the test signals are destined thereto.

By supplying test signals to the external input terminals, the sixth aspect is capable of externally testing the macro circuits, to improve testing efficiency.

The signal lines connect the external terminals and the first to "m"th macro circuits to one another in a half loop so that the lengths of the signal lines between the input terminals of a given macro circuit and the external terminals are equal to one another to eliminate skew in the test signals transmitted through the signal lines, thereby improving the testing speed.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments of the present invention, the problems in the prior art will be explained.

Figure 1:
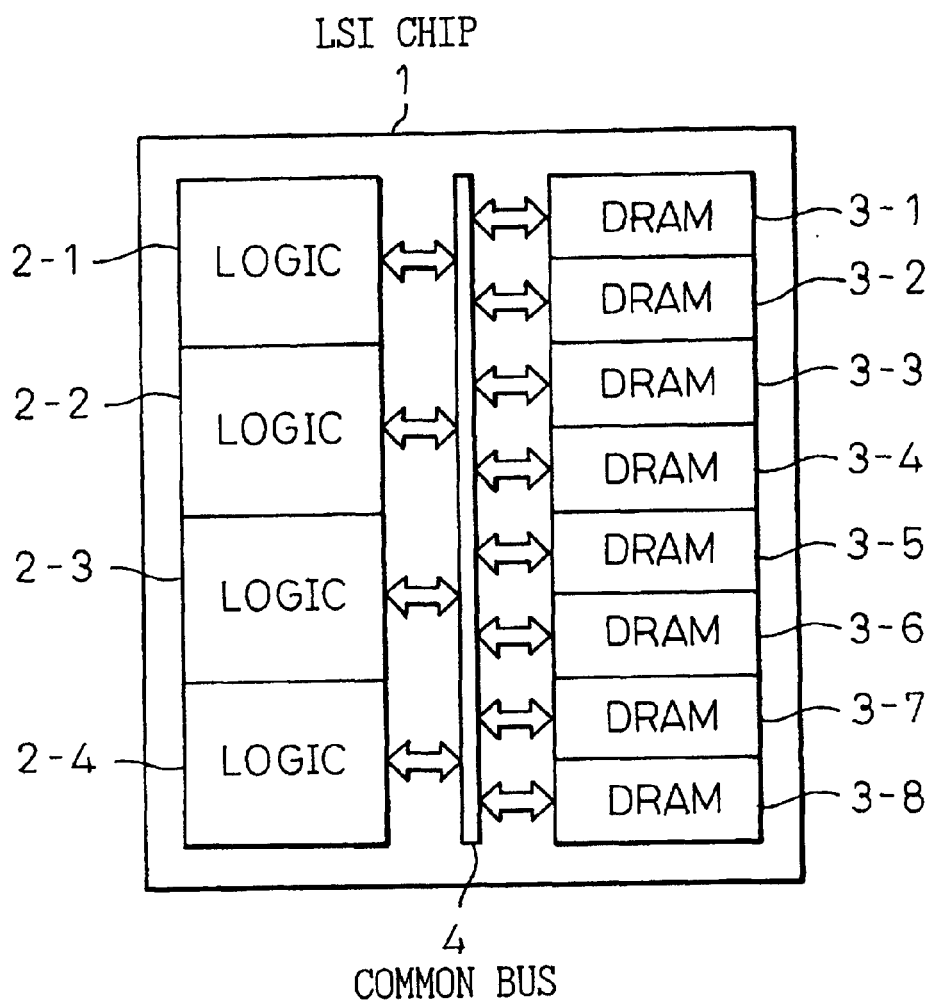
FIG. 1 shows essential parts of an LSI system.

FIG. 1 shows essential parts of an LSI system according to the prior art. The system includes an LSI chip 1, logic circuits 2-1 to 2-4, DRAMs (dynamic random access memories) 3-1 to 3-8 accessed by the logic circuits 2-1 to 2-4, and a common bus 4.

This system must employ a state machine for managing the common bus 4. Since the state machine is complicated, it deteriorates the efficiency of use of the common bus 4.

Now, electronic circuit systems and, in particular, LSI systems and signal transmission methods according to the first to fifth embodiments of the present invention, will be explained.

Figure 2:
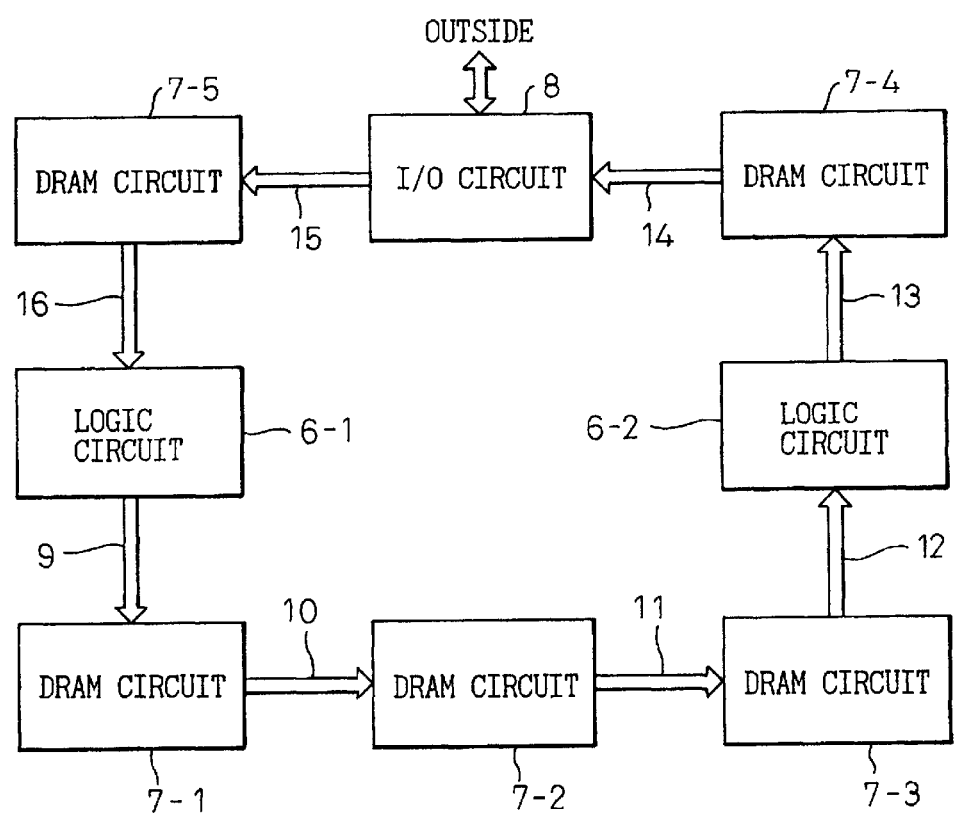
FIG. 2 shows essential parts of an electronic circuit system according to a first embodiment of the present invention.
Figure 3:
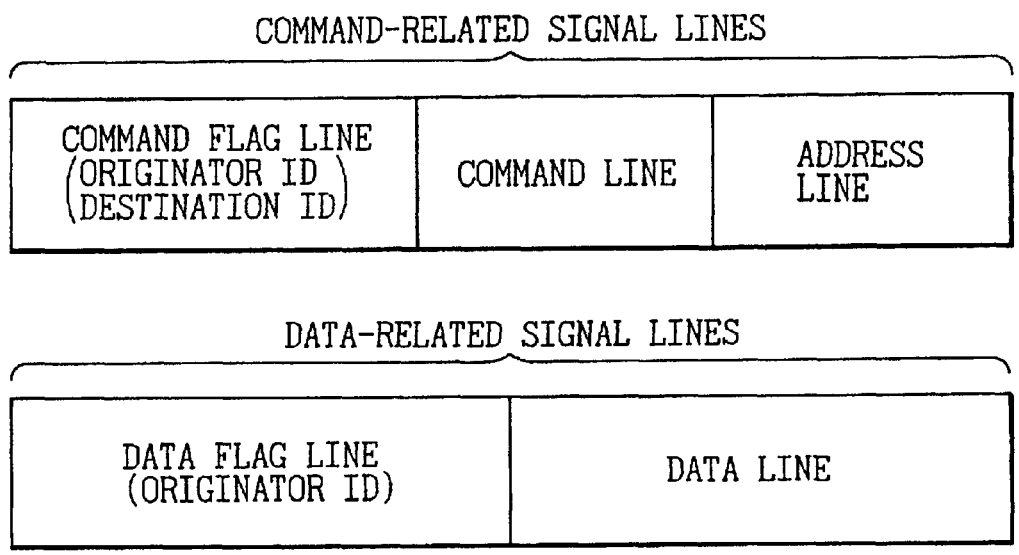
FIG. 3 shows signal lines of the system of the first embodiment.
Figure 4:
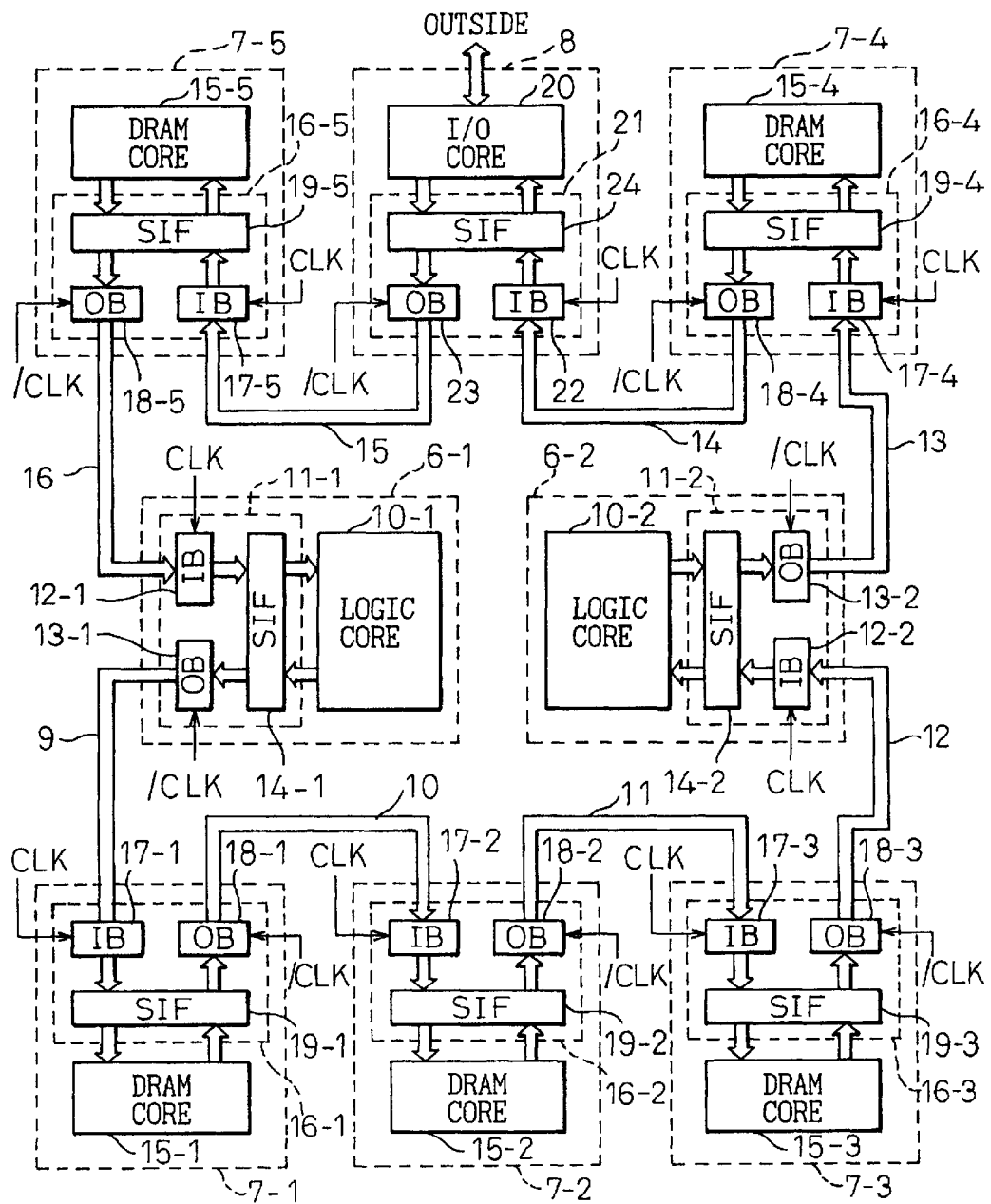
FIG. 4 shows the details of the system of the first embodiment.

FIGS. 2 to 4 show the electronic circuit system of the first embodiment.

The system includes logic circuits 6-1 and 6-2 for processing data, DRAM circuits 7-1 to 7-5 accessed by the logic circuits 6-1 and 6-2, and an I/O circuit 8 accessed by the logic circuits 6-1 and 6-2, for transmitting and receiving signals to and from external circuits.

The logic circuits 6-1 and 6-2, DRAM circuits 7-1 to 7-5, and I/O circuit 8 are each a macro circuit that is a discrete circuit having a specific function and is provided with an address or ID.

A signal line 9 connects output terminals of the logic circuit 6-1 to input terminals of the DRAM circuit 7-1. A signal line 10 connects output terminals of the DRAM circuit 7-1 to input terminals of the DRAM circuit 7-2.

A signal line 11 connects output terminals of the DRAM circuit 7-2 to input terminals of the DRAM circuit 7-3. A signal line 12 connects output terminals of the DRAM circuit 7-3 to input terminals of the logic circuit 6-2.

A signal line 13 connects output terminals of the logic circuit 6-2 to input terminals of the DRAM circuit 7-4. A signal line 14 connects output terminals of the DRAM circuit 7-4 to input terminals of the I/O circuit 8.

A signal line 15 connects output terminals of the I/O circuit 8 to input terminals of the DRAM circuit 7-5. A signal line 16 connects output terminals of the DRAM circuit 7-5 to input terminals of the logic circuit 6-1.

In this way, the logic circuit 6-1, DRAM circuits 7-1 to 7-3, logic circuit 6-2, DRAM circuit 7-4, I/O circuit 8, and DRAM circuit 7-5 are connected to one another into a loop through the signal lines 9 to 16, which serve as the common bus of the prior art.

FIG. 3 shows the structure of one of the signal lines 9 to 16. Each signal line consists of command-related signal lines for transmitting command-related signals and data-related signal lines for transmitting data-related signals.

The command-related signal lines include a command flag line for transmitting a command flag signal containing a command originator ID and a command destination ID, a command line for transmitting a command signal, and an address line for transmitting an address signal containing an access address of the command destination.

The data-related signal lines include a data flag line for transmitting a data flag signal representing a data destination ID and a data line for transmitting a data signal.

FIG. 4 shows the details of the system of FIG. 2. The logic circuits 6-1 and 6-2 have logic cores 10-1 and 10-2 and station circuits 11-1 and 11-2, respectively.

The station circuits 11-1 and 11-2 have input circuits (IB) 12-1 and 12-2, output circuits (OB) 13-1 and 13-2, and station interfaces (SIF) 14-1 and 14-2, respectively.

The DRAM circuits 7-1 to 7-5 have DRAM cores 15-1 to 15-5 and station circuits 16-1 to 16-5, respectively.

The station circuits 16-1 to 16-5 have input circuits 17-1 to 17-5, output circuits 18-1 to 18-5, and station interfaces 19-1 to 19-5, respectively.

The I/O circuit 8 has an I/O core 20 and a station circuit 21. The station circuit 21 has an input circuit 22, an output circuit 23, and a station interface 24.

In the logic circuit 6-i (i being any one of 1 and 2), the input circuit 12-i receives signals at a rise of a clock signal CLK and transfers the signals to the station interface 14-i.

The output circuit 13-i fetches signals from the station interface 14-i at a rise of an inverted clock signal /CLK and transmits the signals.

In response to a request from the logic core 10-i, the station interface 14-i transmits signals from the output circuit 13-i, or accepts signals through the input circuit 12-i, or transfers signals from the input circuit 12-i to the output circuit 13-i.

In the DRAM circuit 7-j (j being any one of 1 to 5), the input circuit 17-j receives signals at a rise of the clock signal CLK and transfers the signals to the station interface 19-j.

The output circuit 18-j fetches signals from the station interface 19-j in response to a rise of the inverted clock signal /CLK and transmits the signals.

In response to a request from the DRAM core 15-j, the station interface 19-j transmits signals from the output circuit 18-j, or accepts signals through the input circuit 17-j, or transfers signals from the input circuit 17-j to the output circuit 18-j.

In the I/O circuit 8, the input circuit 22 receives signals at a rise of the clock signal CLK and transfers the signals to the station interface 24.

The output circuit 23 fetches signals from the station interface 24 at a rise of the inverted clock signal /CLK and transmits the signals.

In response to a request from the I/O core 20, the station interface 24 transmits signals through the output circuit 23, or accepts signals through the input circuit 22, or transfers signals from the input circuit 22 to the output circuit 23.

The operation of the station interface 14-i of the logic circuit 6-i will be explained. When making a read access to the DRAM core 15-j, the logic core 10-i checks a command flag signal among signals received by the input circuit 12-i.

If the command flag signal contains no command originator ID or command destination ID, the logic core 10-i sets, in the signals fetched from the input circuit 12-i, a command originator ID, a command destination ID, a read bit, and an access address in the destination DRAM core 15-j, and transmits the signals from the output circuit 13-i.

If the command flag signal contains a command originator ID and a command destination ID, the logic core 10-i waits for signals having no definite IDs to be received by the input circuit 12-i. If such signals are received by the input circuit 12-i, the logic core 10-i sets, in the signals fetched from the input circuit 12-i, a command originator ID, a command destination ID, a read bit, and an access address in the destination DRAM core 15-j, and transmits the signals from the output circuit 13-i.

When making a write access to the DRAM core 15-j, the logic core 10-i checks a command flag signal among signals received by the input circuit 12-i.

If the command flag signal contains no command flag, the logic core 10-i sets, in the signals fetched from the input circuit 12-i, a command originator ID, a command destination ID, a write bit, an access address in the destination DRAM core 15-j, a data destination ID, and data to be written, and transmits the signals from the output circuit 13-i.

If the command flag signal contains a command flag, the logic core 10-i waits for signals having no command flag to be received by the input circuit 12-i. If such signals are received by the input circuit 12-i, the logic core 10-i sets, in the signals fetched from the input circuit 12-i, a command originator ID, a command destination ID, a write bit, an access address in the destination DRAM core 15-j, a data destination ID, and data to be written, and transmits the signals from the output circuit 13-i.

If a data flag signal among signals received by the input circuit 12-i contains a destination ID that agrees with the ID of the logic circuit 6-i, the logic core 10-i accepts data contained in the received signals, clears the received signals, and transmits the cleared signals from the output circuit 13-i.

If the destination ID in the received signals disagrees with the ID of the logic circuit 6-i, the logic core 10-i transfers the received signals as they are from the input circuit 12-i to the output circuit 13-i without accepting the received signals.

The operation of the station interface 19-j of the DRAM circuit 7-j will be explained. If a command destination ID in a command flag signal in signals received by the input circuit 17-j does not agree with the ID of the DRAM circuit 7-j, the station interface 19-j transfers the received signals as they are to the output circuit 18-j without accepting the received signals.

If the command destination ID agrees with the ID of the DRAM circuit 7-j and if the DRAM core 15-j is busy, the signals received by the input circuit 17-j are transferred as they are to the output circuit 18-j without accepting the received signals.

If the command destination ID agrees with the ID of the DRAM circuit 7-j with a command bit in the received signals indicating a read command and if the DRAM core 15-j is available, the station interface 19-j accepts the received signals, transfers an address signal and the read command signal to the DRAM core 15-j, clears the command flag bit and command bit in the received signals, and transfers the cleared signals to the output circuit 18-j.

When the requested data is read out of the DRAM core 15-j, the station interface 19-j checks to see if a data flag in signals received by the input circuit 17-j is vacant. If the data flag is vacant, the station interface 19-j inserts the ID of the logic circuit that issued the read command into the data flag of the signals and transmits the signals with the read data from the output circuit 18-j.

If the data flag in the signals received by the input circuit 17-j is not vacant, the station interface 19-j waits for signals having a vacant data flag to be received by the input circuit 17-j. When such signals with a vacant data flag are received by the input circuit 17-j, the station interface 19-j inserts the ID of the logic circuit that issued the read command into the data flag of the signals and transmits the signals with the read data from the output circuit 18-j.

If a command destination ID in signals received by the input circuit 17-j agrees with the ID of the DRAM circuit 7-j with a command bit in the received signals indicating a write command and if the DRAM core 15-j is available, the station interface 19-j accepts the received signals, transfers an address signal, the write command signal, and a data signal among the received signals to the DRAM core 15-j, clears the command flag bit and command bit, and transfers the cleared signals to the output circuit 18-j.

The operation of the station interface 24 of the I/O circuit 8 will be explained. If a command destination ID in a command flag signal in signals received by the input circuit 22 disagrees with the ID of the I/O circuit 8, the station interface 24 transfers the received signals as they are from the input circuit 22 to the output circuit 23 without accepting the received signals.

If the command destination ID agrees with the ID of the I/O circuit 8, the station interface 24 accepts the received signals, clears the received signals, and transfers the cleared signals to the output circuit 23.

When transmitting signals contain a command signal from the I/O core 20, the station interface 24 checks to see if a data flag in signals received by the input circuit 22 is vacant. If it is vacant, the station interface 24 transmits the signals with the command signal from the output circuit 23.

If the data flag in the signals received by the input circuit 22 is not vacant, the station interface 24 waits for signals having a vacant data flag. When such signals are received by the input circuit 22, the station interface 24 transmits the signals with the command signal from the output circuit 23.

In this way, even if two or more of the macro circuits, i.e., the logic circuits 6-1 and 6-2, DRAM circuits 7-1 to 7-5, and I/O circuit 8 simultaneously transmit signals, the first embodiment is capable of transmitting these signals in the specified direction in synchronization with the clock signal CLK (/CLK) according to simple protocols up to destination macro circuits, thereby improving signal transmission efficiency and simplifying signal transmission management.

When the I/O circuit 8 transfers command-related signals from an external circuit to the signal line 15, it is preferable to stop the operation of the logic cores 10-1 and 10-2 a predetermined number of clock cycles before.

Figure 5:
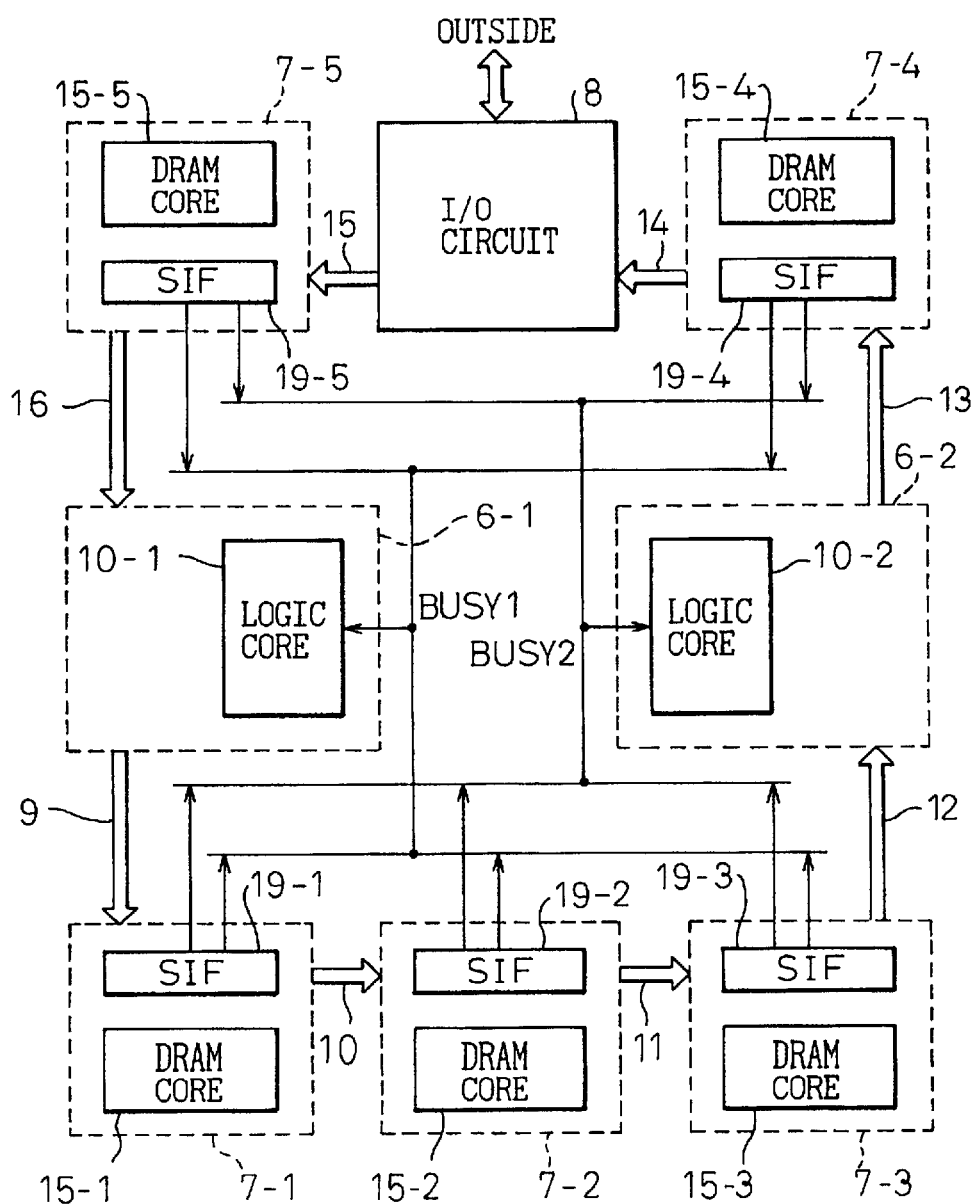
FIG. 5 shows essential parts of an electronic circuit system according to a second embodiment of the present invention.

FIG. 5 shows an electronic circuit system according to the second embodiment of the present invention.

DRAM circuits 7-1 to 7-5 have station interfaces 19-1 to 19-5, respectively, which are each capable of providing a busy signal BUSY1 to a logic core 10-1. While the busy signal BUSY1 is active, the logic core 10-1 is put in a wait state.

The busy signal BUSY1 is activated when a logic core 10-2 or an external circuit is continuously accessing a DRAM core 15-j of the DRAM circuit 7-j (j being any one of 1 to 5), so that the DRAM core 15-j is unable to accept an access from the logic core 10-1.

The station interfaces 19-1 to 19-5 of the DRAM circuits 7-1 to 7-5 also provide each a busy signal BUSY2 to the logic core 10-2. While the busy signal BUSY2 is active, the logic core 10-2 is put in a wait state. The other parts of the second embodiment are the same as those of the first embodiment.

The busy signal BUSY2 is activated when the logic core 10-1 or an external circuit is continuously accessing the DRAM core 15-j so that the DRAM core 15-j is unable to accept an access from the logic core 10-2.

Even if two or more of the macro circuits, i.e., the logic circuits 6-1 and 6-2, DRAM circuits 7-1 to 7-5, and I/O circuit 8 simultaneously transmit signals, the second embodiment is capable of transmitting these signals in a specified direction in synchronization with a clock signal CLK (/CLK) according to simple protocols up to destination macro circuits, thereby improving signal transmission efficiency and simplifying signal transmission management, as in the first embodiment. In addition, if the logic cores 10-1 and 10-2 are unable to access the DRAM circuits, the busy signals BUSY1 and BUSY2 put the logic cores 10-1 and 10-2 in a wait state, thereby improving the operation efficiency of the logic cores 10-1 and 10-2.

Figure 6:
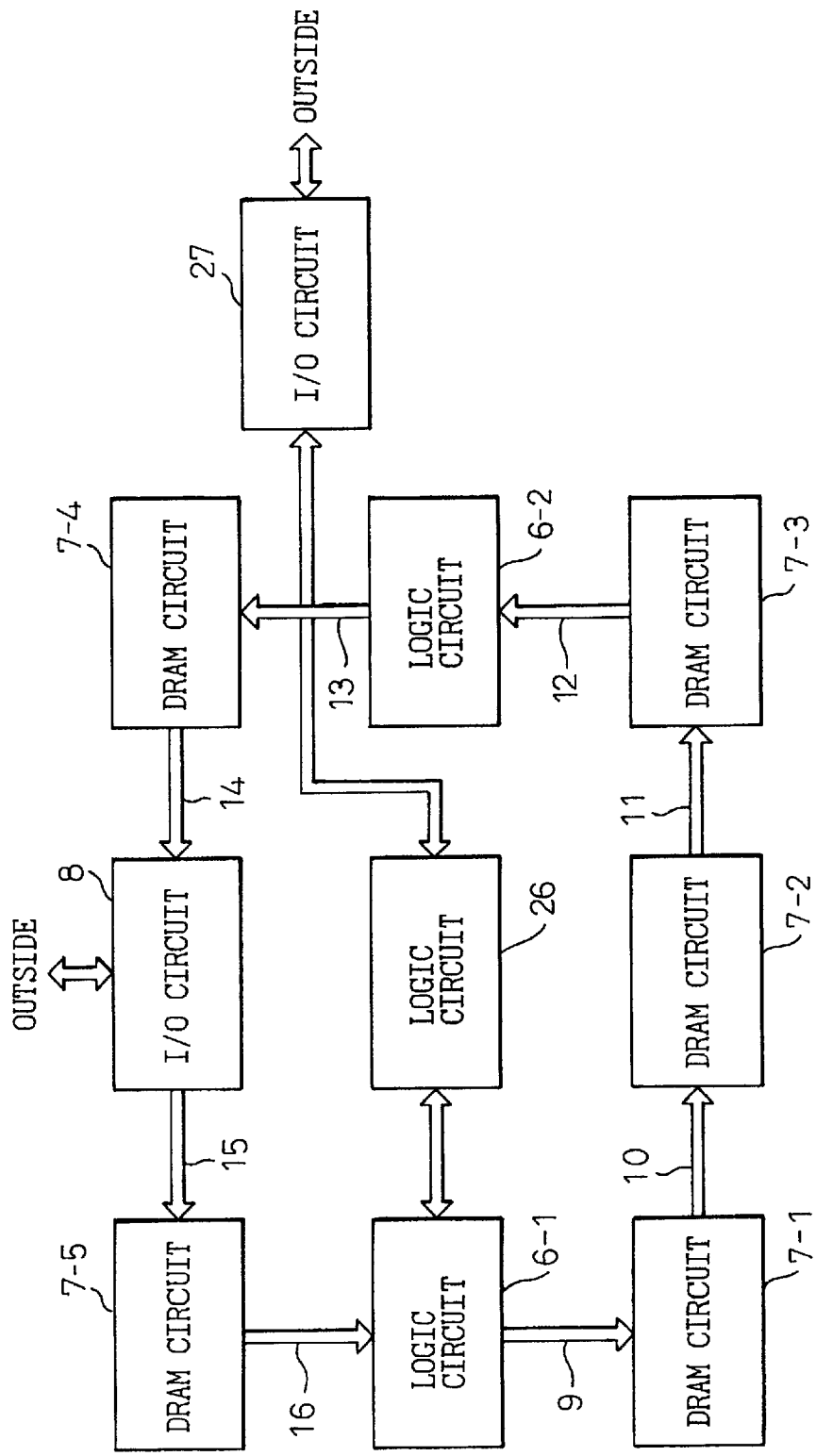
FIG. 6 shows essential parts of an electronic circuit system according to a third embodiment of the present invention.

FIG. 6 shows an electronic circuit system according to the third embodiment of the present invention.

This system has a logic circuit 26 for communicating signals with a logic circuit 6-1, and an I/O circuit 27 for communicating signals with the logic circuit 26. The other arrangements of FIG. 6 are the same as those of the first embodiment of FIG. 2.

Even if two or more of macro circuits including logic circuits 6-1 and 6-2, DRAM circuits 7-1 to 7-5, and I/O circuit 8 simultaneously transmit signals, the third embodiment is capable of transmitting these signals in a specified direction in synchronization with a clock signal CLK (/CLK) according to simple protocols up to destination macro circuits, thereby improving signal transmission efficiency and simplifying signal transmission management.

Similar to the second embodiment, the station interfaces 19-1 to 19-5 of the DRAM circuits 7-1 to 7-5 of the third embodiment may provide the logic core 10-1 with a busy signal BUSY1 and the logic core 10-2 with a busy signal BUSY2.

Any one of the first to third embodiments may omit the I/O circuit 8.

The first to third embodiments may have an I/O circuit that is out of the loop and serves to connect the logic circuits 6-1 and 6-2 to external circuits.

The signal lines 9 to 16 that connect the macro circuits to one another may each have a latch circuit to latch signals in response to the clock signal CLK or the inverted clock signal /CLK. In this case, the input and output circuits of each macro circuit may be omitted.

Figure 7:
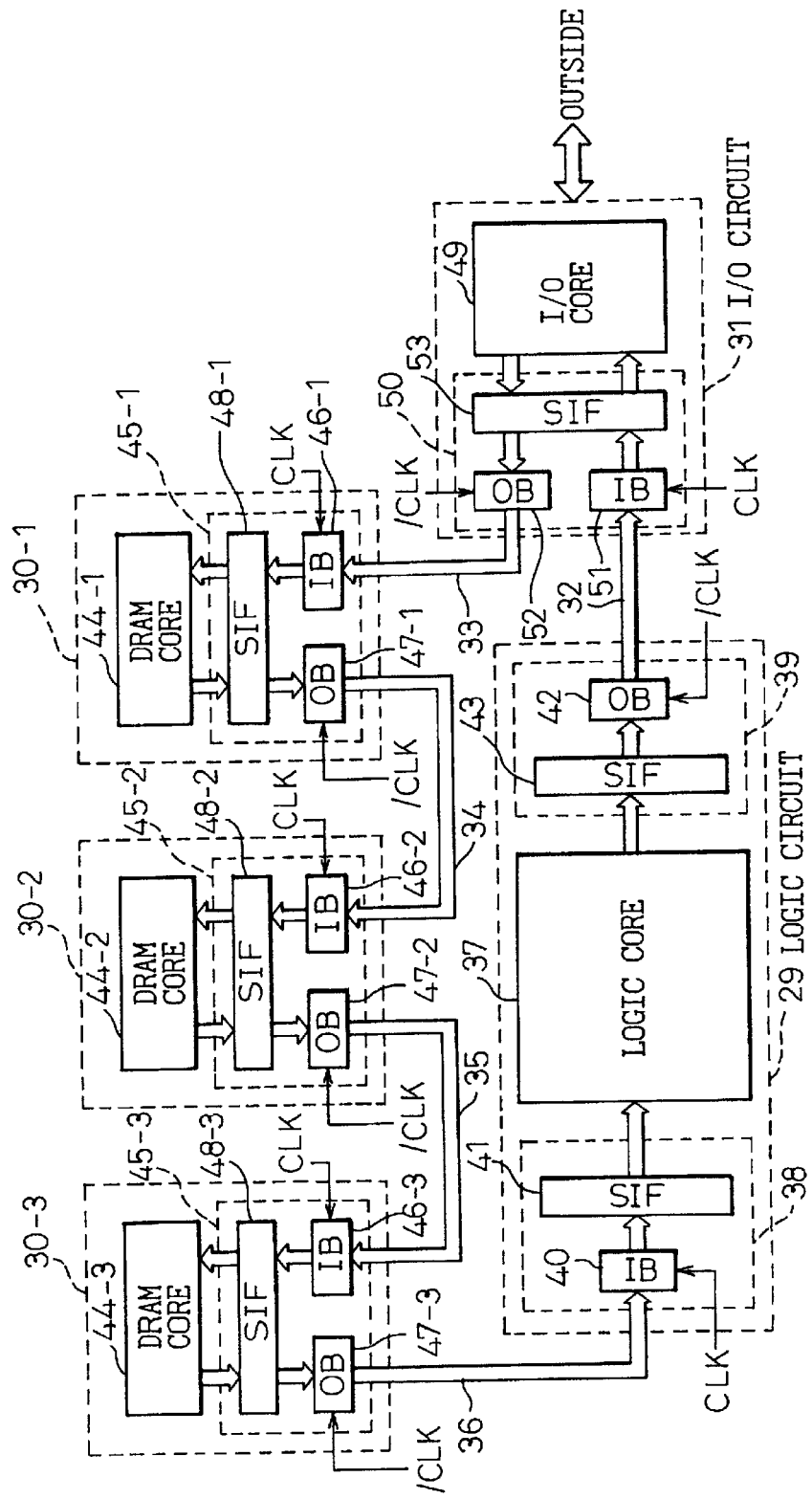
FIG. 7 shows essential parts of an electronic circuit system according to a fourth embodiment of the present invention.

FIG. 7 shows an electronic circuit system according to the fourth embodiment of the present invention.

The system has a logic circuit 29 for processing data, DRAM circuits 30-1 to 30-3 accessed by the logic circuit 29, and an I/O circuit 31 accessed by the logic circuit 29, for communicating signals with external circuits. The logic circuit 29, DRAM circuits 30-1 to 30-3, and I/O circuit 31 have each an ID.

A signal line 32 connects output terminals of the logic circuit 29 to input terminals of the I/O circuit 31. A signal line 33 connects output terminals of the I/O circuit 31 to input terminals of the DRAM circuit 30-1.

A signal line 34 connects output terminals of the DRAM circuit 30-1 to input terminals of the DRAM circuit 30-2. A signal line 35 connects output terminals of the DRAM circuit 30-2 to input terminals of the DRAM circuit 30-3. A signal line 36 connects output terminals of the DRAM circuit 30-3 to input terminals of the logic circuit 29.

In this way, the fourth embodiment connects the logic circuit 29, I/O circuit 31, and DRAM circuits 30-1 to 30-3 to one another in a half loop through the signal lines 32 to 36 with the output terminals of the logic circuit 29 being at the start of the half loop and the input terminals thereof being at the end of the half loop.

The logic circuit 29 has a logic core 37 and station circuits 38 and 39. The station circuit 38 has an input circuit 40 and a station interface 41, and the station circuit 39 has an output circuit 42 and a station interface 43.

The DRAM circuits 30-1 to 30-3 have DRAM cores 44-1 to 44-3 and station circuits 45-1 to 45-3, respectively.

The station circuits 45-1 to 45-3 have input circuits 46-1 to 46-3, output circuits 47-1 to 47-3, and station interfaces 48-1 to 48-1, respectively.

The I/O circuit 31 has an I/O core 49 and a station circuit 50. The station circuit 50 has an input circuit 51, an output circuit 52, and a station interface 53.

The signal lines 32 to 36 are similar to the signal lines 9 to 16 of FIG. 2. The input circuits 40, 51, and 46-1 to 46-3 are similar to the input circuits 12-1, 12-2, 17-1 to 17-5, and 22 of FIG. 4. The output circuits 42, 52, and 47-1 to 47-3 are similar to the output circuits 13-1, 13-2, 18-1 to 18-5, and 23 of FIG. 4.

The station interfaces 48-1 to 48-3 are similar to the station interfaces 19-1 to 19-5 of FIG. 4. The station interface 53 is similar to the station interface 24 of FIG. 4.

If signals received by the input circuit 40 in the logic circuit 29 are destined for the logic core 37, the station interface 41 accepts the signals.

More precisely, if an ID in a data flag signal in the received signals agrees with the ID of the logic circuit 29, the station interface 41 accepts data contained in the signals and transfers the data to the logic core 37.

The station interface 43 transfers signals to the output circuit 42 according to a request from the logic core 37. This will be explained in more detail.

When carrying out a read access to any one of the DRAM cores 44-1 to 44-3, the logic core 37 sets a command originator ID and command destination ID in command flag bits, a read command in a command bit, and a destination address in the DRAM core of the destination DRAM circuit in address bits. These signals are transferred to the output circuit 42.

When carrying out a write access to any one of the DRAM cores 44-1 to 44-3, the logic core 37 sets a command originator ID and command destination ID in command flag bits, a write command in a command bit, an address in the DRAM core of the destination DRAM circuit in address bits, a data originator ID in data flag bits, and data in data bits. These signals are transferred to the output circuit 42.

Even if two or more of the macro circuits, i.e., the logic circuit 29, DRAM circuits 30-1 to 30-3, and I/O circuit 31 simultaneously transmit signals, the fourth embodiment is capable of transmitting these signals in the specified direction through the half loop in synchronization with a clock signal CLK (/CLK) according to simple protocols up to destination macro circuits, thereby improving signal transmission efficiency and simplifying signal transmission management.

The fourth embodiment may omit the I/O circuit 31.

The fourth embodiment may have an I/O circuit that is out of the half loop and serves to connect the logic circuit 29 to external circuits.

Figure 8:
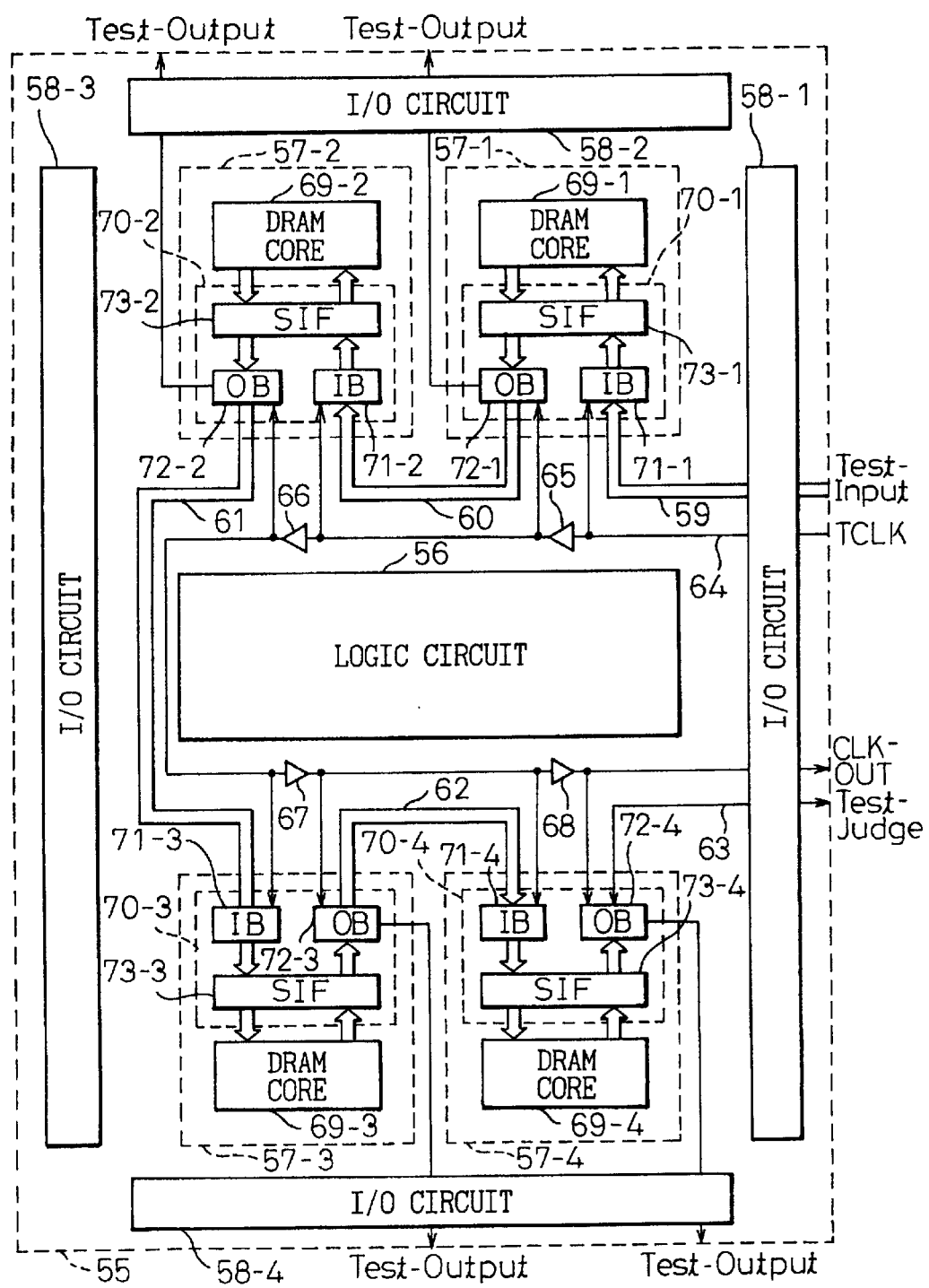
FIG. 8 shows essential parts of an electronic circuit system according to a fifth embodiment of the present invention.
Figure 9:
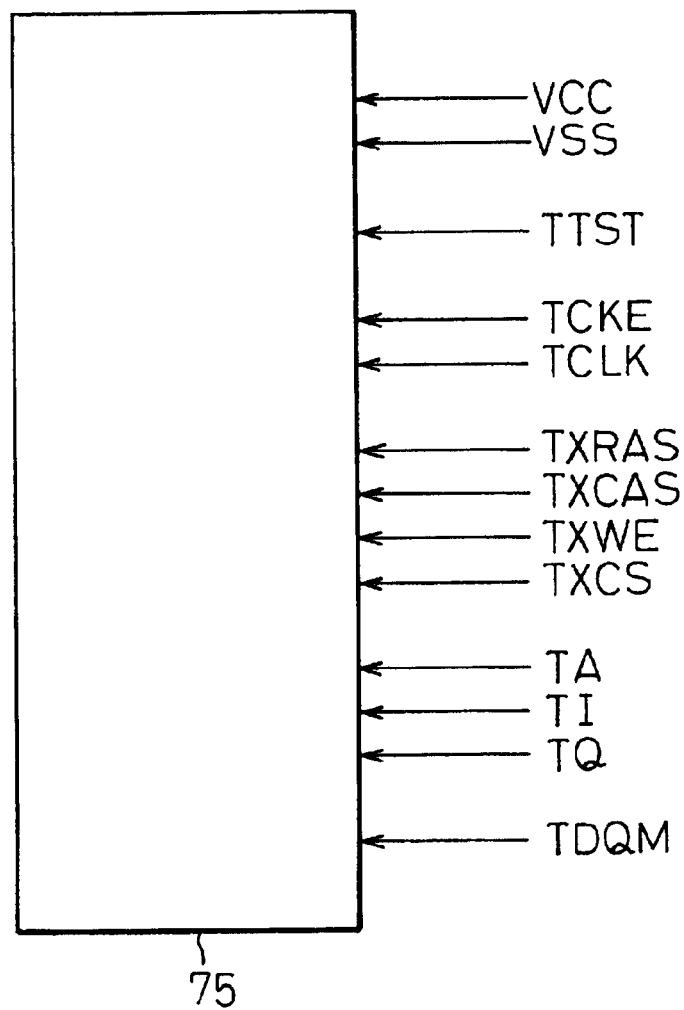
FIG. 9 shows test signals supplied to the system of the fifth embodiment.

FIGS. 8 and 9 show an electronic circuit system according to the fifth embodiment of the present invention.

FIG. 8 shows essential parts of the system. The system has an LSI chip 55, a logic circuit 56 for processing data, DRAM circuits 57-1 to 57-4 accessed by the logic circuit 56, and I/O circuits 58-1 to 58-4 for communicating signals with external circuits.

A signal line 59 connects external test signal input terminals (except one for receiving a test clock signal) to test signal input terminals of the DRAM circuit 57-1. A signal line 60 connects test signal output terminals of the DRAM circuit 57-1 to test signal input terminals of the DRAM circuit 57-2.

A signal line 61 connects test signal output terminals of the DRAM circuit 57-2 to test signal input terminals of the DRAM circuit 57-3. A signal line 62 connects test signal output terminals of the DRAM circuit 57-3 to test signal input terminals of the DRAM circuit 57-4. The system also has a test judge line 63.

In this way, the fifth embodiment connects the external test signal input terminals and the DRAM circuits 57-1 to 57-4 to one another in a half loop through the signal lines 59 to 62 with the external input terminals being at the start of the half loop and the input terminals of the DRAM circuit 57-4 being at the end of the half loop.

FIG. 9 shows test signals supplied to the system of FIG. 8. In FIG. 9, the electronic circuit system 75 of the fifth embodiment receives a test mode signal TTST, a test clock enable signal TCKE, and a test clock signal TCLK.

There are also a test row address strobe signal TXRAS, a test column address strobe signal TXCAS, a test write enable signal TXWE, and a test chip enable signal TXCS.

Further, there are a test address signal TA, an expected value TI for data to be written or read, test read data TQ, and a test data mask signal TDQM. There are also source voltages VCC and VSS.

In FIG. 8, the system has the signal line 64 for transferring the test clock signal TCLK and buffer circuits 65 to 68 for relaying the signal TCLK.

The DRAM circuits 57-1 to 57-4 have DRAM cores 69-1 to 69-4 and station circuits 70-1 to 70-4, respectively.

The station circuits 70-1 to 70-4 have the test signal input circuits 71-1 to 71-4, test signal output circuits 72-1 to 72-4, and test signal station interfaces 73-1 to 73-4, respectively.

The input circuits 71-1 to 71-4 are similar to the input circuits 17-1 to 17-5 of FIG. 4. The output circuits 72-1 to 72-3 are similar to the output circuits 18-1 to 18-5 of FIG. 4. The station interfaces 73-1 to 73-4 are similar to the station interfaces 19-1 to 19-5 of FIG. 4.

A test result (test output) of the DRAM core 69-1 is provided outside through the station interface 73-1, output circuit 72-1, and I/O circuit 58-2. A test result of the DRAM core 69-2 is provided outside through the station interface 73-2, output circuit 72-2, and I/O circuit 58-2.

A test result of the DRAM core 69-3 is provided outside through the station interface 73-3, output circuit 72-3, and I/O circuit 58-4. A test result of the DRAM core 69-4 is provided outside through the station interface 73-4, output circuit 72-4, and I/O circuit 58-4.

The test judge signal 63 indicates whether or not all of the DRAM circuits 57-1 to 57-4 in the half loop have passed the test.

In this way, the fifth embodiment supplies test signals to the external test signal input terminals to externally test the DRAM cores 69-1 to 69-4, thereby improving testing efficiency. Since the test signals are supplied to the DRAM cores 69-1 to 69-4 through the test signal lines 59 to 62 that connect the external input terminals and DRAM cores 69-1 to 69-4 in the half loop, the distances between the test signal input terminals of any one of the DRAM circuits and the external test signal input terminals are equalized with one another, thereby eliminating skew in transmitting the test signals and improving the testing speed.

The LSI chip 55 may have a built-in self-test (BIST) circuit so that the DRAM circuits 57-1 to 57-4 are tested by test signals that are generated by the BIST circuit in response to an input signal supplied to the I/O circuit 58-1.

The loop or half loop that involves the DRAM circuits 57-1 to 57-4 may include logic circuits so that the DRAM circuits 57-1 to 57-4 and logic circuits, or only the DRAM circuits, or only the logic circuits are tested.

As explained above, the first, second, fourth, and fifth aspects of the present invention transmit signals in a single direction in synchronization with a clock signal up to destination macro circuits even if macro circuits simultaneously transmit signals, thereby improving signal transmission efficiency and simplifying signal transmission management.

The third and sixth aspects of the present invention externally test macro circuits by entering test signals to external test signal input terminals, thereby improving testing efficiency. These aspects connect first to t"m"h macro circuits to one another in a half loop through signal lines to provide the macro circuits with test signals. This arrangement equalizes the distances between the test signal input terminals of each macro circuit and the external test signal input terminals with one another, thereby eliminating skew in transmitting the test signals and improving the testing speed.

Many different embodiments of the present invention may be constructed without departing from the spirit and scope of the present invention, and it should be understood that the present invention is not limited to the specific embodiments described in this specification, except as defined in the appended claims.

What is claimed is:

1. An electronic circuit system comprising:
   at least three macro circuits each including a logic circuit or a memory circuit, and having a plurality of input terminals and a plurality of output terminals; and
   a plurality of signal lines for connecting the macro circuits to one another into a loop to transmit signals in a single specified direction through the signal lines in synchronization with a clock signal,
   each of the macro circuits receiving the signals at the input terminals thereof, accepting the received signals if the received signals are destined thereto, and transferring the received signals to the output terminals thereof without accepting the received signals if the received signals are not destined thereto.

2. An electronic circuit system as claimed in claim 1, wherein any one of the macro circuits that accepted the received signals clears the received signals and transmits the cleared signals from the output terminals thereof.

3. An electronic circuit system as claimed in claim 1, wherein any one of the macro circuits, which are unavailable for accepting the received signals even if the received signals are destined thereto, transfers the received signals as they are, without accepting them, to the output terminals thereof.

4. An electronic circuit system as claimed in claim 1, wherein:
   each of the macro circuits has a core and a station circuit; and
   the station circuit selectively carries out at least the outputting of signals to the output terminals according to a request from the core, the accepting, clearing, and transferring to the output terminals of received signals, and the transferring of received signals as they are, without accepting them, to the output terminals.

5. An electronic circuit system as claimed in claim 4, wherein:
   the station circuit has an input circuit, an output circuit, and a station interface;
   the input circuit fatches signals received by the input terminals in response to the clock signal;
   the output circuit fetches signals from the station interface and transfers the signals to the output terminals in response to the clock signal; and
   the station interface selectively carries out at least the outputting of signals to the output circuit according to a request from the core, the accepting, clearing, and transferring to the output circuit of signals received by the input circuit, and the transferring of signals received by the input circuit as they are, without accepting them, to the output circuit.

6. An electronic circuit system as claimed in claim 1, wherein the macro circuits include an I/O circuit for transmitting signals to an external circuit.

7. An electronic circuit system as claimed in claim 1, wherein the macro circuits include an I/O circuit for receiving signals from an external circuit.

8. An electronic circuit system as claimed in claim 1, wherein the macro circuits include an I/O circuit for communicating signals with an external circuit.

9. An electronic circuit system as claimed in claim 1, wherein each memory circuit among the macro circuits provides a busy signal when continuously accessed by another macro circuit, so that any other macro circuit that intends to access the memory circuit is put in a wait state in response to the busy signal.

10. An electronic circuit system as claimed in claim 1, wherein each memory circuit among the macro circuits provides a busy signal when continuously accessed by an external circuit, so that any other macro circuit that intends to access the memory circuit is put in a wait state in response to the busy signal.

11. An electronic circuit system as claimed in claim 1, further comprising a macro circuit that is out of the loop.

12. An electronic circuit system as claimed in claim 1, wherein:
   the signal lines include command-related lines for transmitting command-related signal and data-related lines for transmitting data-related signals;
   the command-related lines include a command flag line for transmitting a command flag signal that contains a command originator and a command destination, a command line for transmitting a command signal, and an address line for transmitting an address signal indicating an address in a macro circuit that is the command destination; and the data-related lines include a data flag line for transmitting a data flag signal indicating a data destination and a data line for transmitting a data signal.

13. An electronic circuit system as claimed in claim 12, wherein the logic circuit transmits the following signals from the output terminals thereof when carrying out a read access to one of the memory circuits:
   a command flag signal indicating a command originator and a command destination;
   a command signal indicating a read command; and
   an address signal indicating an address to access in the memory circuit.

14. An electronic circuit system as claimed in claim 12, wherein the logic circuit transmits the following signals from the output terminals thereof when carrying out a write access to one of the memory circuits:
   a command flag signal indicating a command originator and a command destination;
   a command signal indicating a write command;
   an address signal indicating an address to access in the memory circuit;
   a data flag signal indicating a data destination; and
   a data signal.

15. An electronic circuit system as claimed in claim 14, wherein the operation of the core of the logic circuit is stopped before the I/O circuit transfers command-related signals from an external circuit to the signal lines.

16. An electronic circuit system as claimed in claim 15, wherein the operation of the core of the logic circuit is stopped a predetermined number of clock cycles before the I/O circuit transfers command-related signals from an external circuit to the signal lines.

17. An electronic circuit system comprising:
   a first macro circuit constituted by a logic circuit having a plurality of input terminals and a plurality of output terminals;
   second to "n"th macro circuits (n being an integer larger than 3) each including a memory circuit but no logic circuit, and having a plurality of input terminals and a plurality of output terminals; and
   a plurality of signal lines for connecting the first to "n"th macro circuits to one another into a half loop with the output terminals of the first macro circuit being at the start of the half loop and the input terminals of the first macro circuit at the end of the half loop, to transmit signals in a single specified direction through the signal lines in synchronization with a clock signal,
   the first macro circuit accepting signals received by the input terminals thereof if the received signals are destined for the first macro circuit,
   each of the second to "n"th macro circuits accepting signals received by the input terminals thereof if the received signals are destined thereto and transmitting the received signals as they are from the output terminals thereof, without accepting the received signals, if the received signals are not destined thereto.

18. An electronic circuit system as claimed in claim 17, wherein:
   each of the second to "n"th macro circuits has a core and a station circuit; and
   the station circuit selectively carries out at least the outputting of signals to the output terminals according to a request from the core, the accepting, clearing, and transferring to the output terminals of received signals, and the transferring of received signals as they are, without accepting them, to the output terminals.

19. An electronic circuit system as claimed in claim 18, wherein:
   the station circuit has an input circuit, an output circuit, and a station interface;
   the input circuit fetches signals received by the input terminals in response to the clock signal;
   the output circuit fetches signals from the station interface and transfers the signals to the output terminals in response to the clock signal; and
   the station interface selectively carries out at least the outputting of signals to the output circuit according to a request from the core, the accepting, clearing, and transferring to the output circuit of signals received by the input circuit, and the transferring of signals received by the input circuit as they are, without accepting them, to the output circuit.

20. An electronic circuit system as claimed in claim 19, wherein each of the signal lines connects the adjacent macro circuit to each other through a latch circuit for latching signals in synchronization with the clock signal.

21. An electronic circuit system as claimed in claim 17, wherein the second to "n"th macro circuits include not only the memory circuits, but also an I/O circuit for transmitting signals to an external circuit.

22. An electronic circuit system as claimed in claim 17, wherein the second to "n"th macro circuits include not only the memory circuits, but also an I/O circuit for receiving signals from an eternal circuit.

23. An electronic circuit system as claimed in claim 17, wherein the second to "n"th macro circuits include not only the memory circuits, but also an I/O circuit for communicating signals with an external circuit.

24. An electronic circuit system as claimed in claim 17, wherein:
   the signal lines include command-related lines for transmitting command-related signals and data-related lines for transmitting data-related signals;
   the command-related lines include a command flag line for transmitting a command flag signal that contains a command originator and a command destination, a command line for transmitting a command signal, and an address line for transmitting an address signal indicating an address in a macro circuit that is the command destination; and
   the data-related lines include a data flag line for transmitting a data flag signal indicating a data destination and a data line for transmitting a data signal.

25. An electronic circuit system as claimed in claim 24, wherein the logic circuit transmits the following signals from the output terminals thereof when carrying out a read access to one of the memory circuits:
   a command flag signal indicating a command originator and a command destination;
   a command signal indicating a read command; and
   an address signal indicating an address to access in the memory circuit.

26. An electronic circuit system as claimed in claim 24, wherein the logic circuit transmits the following signals from the output terminals thereof when carrying out a write access to one of the memory circuits:

a command flag signal indicating a command originator and a command destination;

a command signal indicating a write command;

an address signal indicating an address to access in the memory circuit;

a data flag signal indicating a data destination; and a data signal.

27. An electronic circuit system as claimed in claim 26, wherein the operation of the core of the logic circuit is stopped before the I/O circuit transfers command-related signals from an external circuit to the signal lines.

28. An electronic circuit system as claimed in claim 27, wherein the operation of the core of the logic circuit is stopped a predetermined number of clock cycles before the I/O circuit transfers command-related signals from an external circuit to the signal lines.

29. An electronic circuit system comprising:

a plurality of external input terminals for receiving test signals;

first to "m−1"th macro circuits (m being an integer larger than 2) each having a plurality of input terminals and a plurality of output terminals for receiving and transmitting the test signals;

an "m"th macro circuit having input terminals for receiving the test signals; and a plurality of signal lines for transmitting the test signals and connecting the external input terminals and the first to "m"th macro circuits to one another into a half loop with the external input terminals being at the start of the half loop and the input terminals of the "m"th macro circuit at the end of the half loop, to transmit the test signals in single specified direction through the signal lines in synchronization with a clock signal, each of the first to "m−1"th macro circuits accepting the test signals received by the input terminals thereof if the test signals are destined thereto.

the "m"th macro circuit accepting the test signals received by the input terminals thereof if the test signals are destined thereto.

30. An electronic circuit system as claimed in claim 29, wherein the macro circuits are memory circuits.

31. An electronic circuit system as claimed in claim 29, wherein:

each of the macro circuits has a core and a station circuit; and the station circuit selectively carries out at least the accepting of received signals and the transferring of the received signals to the output terminals.

32. An electronic circuit system as claimed in claim 31, wherein:

the station circuit has an input circuit, an output circuit, and a station interface;

the input circuit fetches signals received by the input terminals in response to the clock signal;

the output circuit fetches signals from the station interface and transfers the signals to the output terminals in response to the clock signal; and the station interface selectively carries out at least the accepting of received signals and the transferring of the received signals to the output terminals.

33. An electronic circuit system as claimed in claim 29, wherein each of the signal lines connects the adjacent macro circuits to each other through a latch circuit for latching signals in synchronization with the clock signal.

34. A signal transmission method comprising the steps of:

connecting at least three macro circuits each having a plurality of input terminals and a plurality of output terminals to one another into a loop to transmit signals in a single specified direction through signal lines in synchronization with a clock signal; and making each of the macro circuit accept signals received by the input terminals thereof if the received signals are destined thereto and transfer the received signals as they are, without accepting them, to the output terminals thereof if the received signals are not destined thereto.

35. A signal transmission method comprising the steps of:

connecting first to "n"th macro circuits (n being an integer larger than 3) each having a plurality of input terminals and a plurality of output terminals to one another through signal lines into a half loop, the first macro circuit being a logic circuit, each of the second to "n"th macro circuits including a memory circuit but no logic circuit and having a plurality of input terminals and a plurality of output terminals, the output terminals of the first macro circuit being at the start of the half loop, the input terminals of the first macro circuit being at the end of the half loop to transmit signals in a single specified direction through the signal lines in synchronization with a clock signal;

making each of the second to "n"th macro circuits accept signals received by the input terminals thereof if the received signals are destined thereto and transmit the received signals are destined thereto and transmit the received signals from the output terminals thereof, without accepting the received signals, if the received signals are not destined thereto; and making the first macro circuit accept signals received by the input terminals thereof if the received signals are destined thereto.

36. A signal transmission method comprising the steps of:

connecting a plurality of external input terminals for receiving test signals, first to "m−1"th macro circuits (m being an integer greater than 2) each having a plurality of input terminals and a plurality of input terminals for receiving and transmitting the test signals, and an "m"th macro circuit having a plurality of input terminals for receiving the test signals, to one another into a half loop through signals lines for transmitting the test signals, the external input terminals being at the start of the half loop, the input terminals of the "m"th macro circuit being at the end of the half loop to transmit the test signals in a single specified direction through the signal lines in synchronization with a clock signal;

making each of the first to "m"th macro circuits accept the test signals received by the input terminals thereof if the test signals are destined thereof and transmitting the test signals from the output terminals thereof, without accepting the test signals, if the test signals are destined thereto; and making the "m"th macro circuit accept the test signals received by the input terminals thereof if the test signals are destined thereto.

37. A signal transmission method as claimed in claim 36, wherein the signal lines include an I/O circuit for receiving, from the outside, test signals for testing the first to "m"th macro circuits.

38. A signal transmission method as claimed in claim 36, wherein the test signal lines include an I/O circuit for receiving, from the outside, test signals for testing memory circuits among the first to "m"th macro circuits.

39. A signal transmission method as claimed in claim 36, wherein the test signal lines include an I/O circuit for receiving, from the outside, test signals for testing logic circuits among the first to "m"th macro circuits.

40. A signal transmission method as claimed in claim 36, wherein the test signal lines include an I/O circuit and a built-in self-test circuit that generates test signals for testing the first to "m"th macro circuits according to signals entered into the I/O circuit.

* * * * *